US012625999B2

(12) United States Patent
Chopra et al.

(10) Patent No.: US 12,625,999 B2
(45) Date of Patent: May 12, 2026

(54) LEVERAGING ACCESS CONTROLS TO SECURE BACKUP DATA STORED ON A CLOUD-BASED OBJECT STORAGE

(71) Applicant: EMC IP Holding Company LLC, Hopkinton, MA (US)

(72) Inventors: Shelesh Chopra, Bangalore (IN); Sunil Yadav, Bangalore (IN); Tushar Dethe, Bangalore (IN); Prabhat Kumar Dubey, Chikkanagamangala (IN); Ravi Vijayakumar Chitloor, Bengaluru (IN); Amarendra Behera, Bangalore (IN); Himanushu Arora, Bangalore (IN); Jigar Bhanushali, Valsad (IN); Deependra Singh, Uttar Pradesh (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 780 days.

(21) Appl. No.: 17/184,111

(22) Filed: Feb. 24, 2021

(65) Prior Publication Data

US 2022/0269809 A1 Aug. 25, 2022

(51) Int. Cl.
| | |
|---|---|
| *G06F 21/62* | (2013.01) |
| *G06F 16/245* | (2019.01) |
| *H04L 9/08* | (2006.01) |
| *H04L 67/1097* | (2022.01) |

(52) U.S. Cl.
CPC ........ *G06F 21/6227* (2013.01); *G06F 16/245* (2019.01); *H04L 9/08* (2013.01); *H04L 67/1097* (2013.01)

(58) Field of Classification Search
CPC .............. G06F 21/6227; G06F 16/245; G06F 11/1458; G06F 21/6218; G06F 2221/2141; H04L 9/08; H04L 67/1097; H04L 9/40; H04L 9/088; H04L 9/0894; H04L 63/0428
USPC ........................................................ 713/164
See application file for complete search history.

(56) References Cited

U.S. PATENT DOCUMENTS

| | | | | | |
|---|---|---|---|---|---|
| 10,095,587 | B1 * | 10/2018 | Varrin | ................. | G06F 11/2074 |
| 11,249,892 | B2 * | 2/2022 | Vijay | ................. | G06F 11/1458 |
| 11,394,661 | B2 * | 7/2022 | Cook | ................... | H04L 47/762 |
| 11,973,758 | B2 * | 4/2024 | Baryshnikov | ....... | H04L 41/5045 |
| 12,095,734 | B1 * | 9/2024 | Engskow | ........... | H04L 63/0272 |

(Continued)

*Primary Examiner* — Philip J Chea
*Assistant Examiner* — Ghizlane Maazouz
(74) *Attorney, Agent, or Firm* — Dergosits & Noah LLP; Todd A. Noah

(57) ABSTRACT

Described is a system that leverages object storage provided access controls to secure backup data stored on a third-party cloud-based object storage. More particularly, the system may implement a mechanism that ensures that a backup system acts as a gateway for accessing the backup data stored on the object storage. For example, the system may prevent object storage administrative accounts that are authorized to access data directly on the storage from maliciously or inadvertently jeopardizing the integrity of the backup data. Moreover, the backup system may encrypt the backup data to prevent such administrative accounts from performing various backup related operations such as data recovery. Accordingly, to perform backup operations and decrypt the backup data, an account must be authorized by the backup system acting as an exclusive gateway to the backup data stored on a third-party storage.

20 Claims, 5 Drawing Sheets

(56) References Cited

U.S. PATENT DOCUMENTS

| 12,362,930 | B2 * | 7/2025 | Chang | G06F 21/602 |
| 2010/0031058 | A1 * | 2/2010 | Kito | G06F 21/602 |
| | | | | 713/193 |
| 2020/0409909 | A1 * | 12/2020 | Moldvai | H04L 51/42 |
| 2021/0124623 | A1 * | 4/2021 | Zou | G06F 9/455 |
| 2021/0243190 | A1 * | 8/2021 | Bargury | G06F 21/604 |
| 2021/0359855 | A1 * | 11/2021 | Voss | G06F 11/1458 |
| 2022/0004485 | A1 * | 1/2022 | Vijay | G06F 11/1464 |
| 2022/0092193 | A1 * | 3/2022 | Nijasure | G06F 21/602 |
| 2022/0094686 | A1 * | 3/2022 | Jain | H04L 63/20 |
| 2022/0179986 | A1 * | 6/2022 | Veeramachaneni | G06F 3/0622 |
| 2022/0245034 | A1 * | 8/2022 | Nara | G06F 11/1435 |
| 2022/0263657 | A1 * | 8/2022 | Chang | G06F 21/602 |
| 2023/0224304 | A1 * | 7/2023 | Lukanov | H04L 63/0853 |
| | | | | 726/1 |
| 2023/0289266 | A1 * | 9/2023 | Littlefield | G06F 11/1448 |

* cited by examiner

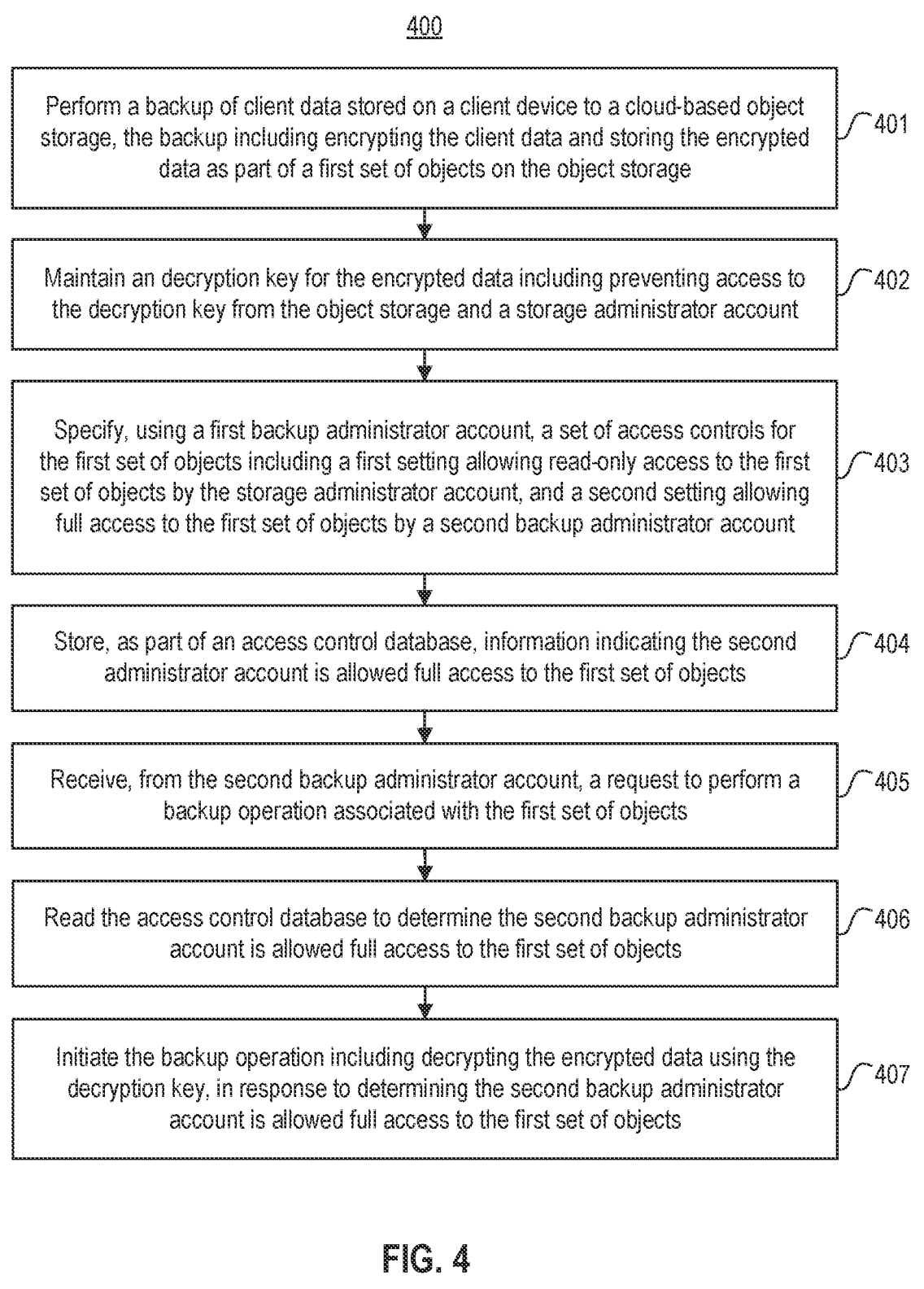

400

Perform a backup of client data stored on a client device to a cloud-based object storage, the backup including encrypting the client data and storing the encrypted data as part of a first set of objects on the object storage — 401

Maintain an decryption key for the encrypted data including preventing access to the decryption key from the object storage and a storage administrator account — 402

Specify, using a first backup administrator account, a set of access controls for the first set of objects including a first setting allowing read-only access to the first set of objects by the storage administrator account, and a second setting allowing full access to the first set of objects by a second backup administrator account — 403

Store, as part of an access control database, information indicating the second administrator account is allowed full access to the first set of objects — 404

Receive, from the second backup administrator account, a request to perform a backup operation associated with the first set of objects — 405

Read the access control database to determine the second backup administrator account is allowed full access to the first set of objects — 406

Initiate the backup operation including decrypting the encrypted data using the decryption key, in response to determining the second backup administrator account is allowed full access to the first set of objects — 407

FIG. 4

LEVERAGING ACCESS CONTROLS TO SECURE BACKUP DATA STORED ON A CLOUD-BASED OBJECT STORAGE

TECHNICAL FIELD

This disclosure relates to cloud-based storage systems, and more particularly, managing access to backup data stored on a cloud-based object storage.

BACKGROUND

Cloud-based storage systems (or on-demand storage systems) may provide various tools that are crucial for enterprise level network clients. For example, clients (or customers) may rely on such systems for data protection and recovery services that efficiently back up and recover data in the event of data loss to allow business applications to remain in service or quickly come back up to service. As part of the data protection and recovery infrastructure, clients may rely on third-party cloud-based storages (or services) to leverage the benefits associated with such systems such as cost efficiency (e.g. pay-per-use model) and scalability. These cloud-based systems may implement an object-based storage architecture, and accordingly, client data may be stored as objects (or data objects). To allow for the management of client data, the object storage may provide the ability to create a storage administrator account. For example, the storage administrator account may have direct access to the storage allowing the account to monitor and manage the client data. However, the client may store different types of data on the cloud-based object storage, and each type of data may have different security requirements. For example, the client may require that backup data stored on the object storage be subject to enhanced security requirements that are administered by the data protection and recovery infrastructure. These enhanced security requirements may include ensuring the integrity and confidentiality of the backup data. For example, native security measures provided by the cloud-based object storage may not prevent a storage administrator from directly accessing the backup data and performing a recovery procedure. In other words, the storage administrator may potentially circumvent the security mechanisms implemented by the data protection and recovery infrastructure. Accordingly, there is a continued need for mechanisms that allow data protection and recovery infrastructure to secure critical backup data stored on a third-party cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 4 is a flow diagram illustrating an example method of specifying access controls for backup data stored on an object storage according to one or more embodiments of the disclosure.

DETAILED DESCRIPTION

Figure 1:
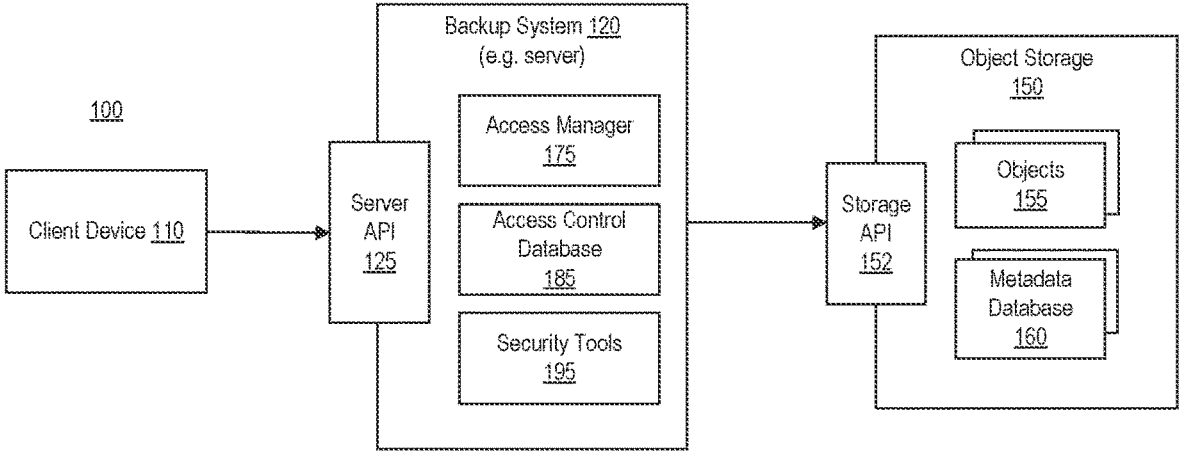
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for leveraging access controls to secure backup data stored on a cloud-based object storage. In some embodiments, the system may be implemented as part of a backup system that provides backup and recovery services to a client device. The backup system may also act as an intermediary between the client device and a third-party cloud-based object storage. For example, the system may back up client data to the cloud-based object storage and implement mechanisms to safeguard the integrity of the backup data. In some embodiments, the system may implement a mechanism that ensures that the backup system acts as the exclusive gateway for performing backup operations on backup data stored on the object storage. For example, the third-party cloud-based object storage may administer various storage administrator accounts that are authorized to have direct access to the storage for data management activities. Accordingly, the system may prevent such storage administrator accounts (or users) from maliciously or inadvertently jeopardizing the integrity of the backup data. Moreover, the system may implement a mechanism to preserves the confidentiality of the backup data by preventing the storage administrator account from performing data recovery. In other words, the system may ensure that security measures for the backup data remain under the purview of the backup system even when the backup data is stored on a third-party storage.

In some embodiments, to provide such a capability, the backup system may leverage access control functionality provided by the cloud-based object storage. For example, the backup system may leverage native tools provided by the object storage that allow account-based access control to the data. For example, these native tools may include an access control API (application programming interface) provided by the object storage. However, these native tools may not preserve the confidentially of the backup data. Accordingly, the backup system may provide additional mechanisms such as encryption to protect confidentiality. In other words, even if a storage administrator account were to access (or read) the backup data, the account may not be able to perform a recovery without the decryption key, which is secured by the backup system. For example, the backup system may implement security mechanisms to prevent a decryption key from being accessible from the object storage, and thus, the storage administrator account. As a result, to perform backup operations requiring decryption, an account must be authorized by the backup system acting as the exclusive gateway for initiating backup operations. This prevents circumvention of the security controls implemented by the backup system despite the backup data being stored on a third-party object storage.

Thus, the backup system may provide a tailored approach that allows the storage administrator account to be aware of the existence of the backup data, which is required for data management activities, but restrict the ability of the account to perform operations that could potentially jeopardize the integrity or confidentiality of the backup data. Such a capability may be a critical feature to clients that may be hesitant to store data on a third-party object storage. Accordingly, in some embodiments, the system provides the ability for a client to implement its own backup system security policies and maintain a certain degree of control over the backup data despite the backup data being stored on a third-party object storage, which may administer its own access accounts. Accordingly, in some embodiments, the system provides an efficient mechanism for a backup system to secure backup data stored on a third-party object storage by leveraging storage provider tools while still preventing circumvention by accounts administered by the third-party storage provider.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a backup system (e.g. a cloud-based component/gateway and/or a proxy server) 120, and a cloud-based (or on-demand) object storage 150. In general, the backup system 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the backup system 120 may be provided as part of the backup service provided by the first entity (e.g. Dell EMC), and the object storage 150 may be provided as part of a third-party cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system)

150 may include a persistent object storage that implements a storage architecture that manages data as an object(s) 155. For example, each object 155 stored by the object storage 150 may include data, meta-data, and/or a globally unique identifier for the object.

The backup system 120 may act as an intermediary (or gateway) for managing client backup data stored on the object storage 150. In some embodiments, the backup system 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The backup system 120 may also provide enhanced security by being a single secure point of access for a client to access data stored externally on the object storage 150. For example, a client device 110 may implement a certain network configuration (e.g. firewall) that limits external access to the client environment. Such a network configuration may be customized to authorize external access to the client device 110 only by the backup system 120 and not by the object storage 150 directly.

In addition, the backup system 120 may also allow the client device 110 to offload resource-intensive data management processing. For example, the backup system 120 may handle backup-related data processing before storing data into the object storage 150. Accordingly, the backup system 120 may provide advantages over traditional proxy servers that merely forward data to the object storage 150. In addition, the backup system 120 may be an application or hardware component remote from the client device 110 (e.g. as part of a cloud-based service). Accordingly, the backup system 120 may be scalable such that it may perform data operations in parallel for multiple client devices 110 and for multiple object storages 150.

As described, the backup system 120 may act as an intermediary for communications between the client device 110 and an object storage 150. For example, these communications may include requests by the client device 110 to perform data operations on the object storage 150, which are routed through the backup system 120. For example, the client device 110 may provide (or send, transmit, etc.) client data (or data) to the backup system 120 using a server API 125. The backup system 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to backup and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for specifying access controls for an object 155 stored on the object storage 150. For example, an access control may specify that only a particular administrator account may modify backup data stored on the object storage 150. It should be noted that the same set of operations provided by the server API 125 may be used by the client device 110 irrespective of the type of object storage 150. To provide such object-storage-agnostic functionality, the backup system 120 may include a function library that includes object-storage-specific functions. Accordingly, the backup system 120 may use such object-storage-specific functions to interact directly with the object storage 150. For example, the backup system 120 may initiate data operations directly on the object storage 150 by calling various methods (functions, operations, etc.) of the storage API 152. In some embodiments, the storage API 152 may include only a standard set of storage operations. Accordingly, the backup system 120 may implement efficient storage and recovery procedures as further described herein.

As described, the backup system 120 may specify access controls for backup data stored on the object storage 150. Accordingly, the backup system 120 may include an access manager 175. The access manager (or manager) 175 may coordinate (or manage, orchestrate, execute, automate, etc.) the initiation (or execution) of operations on the object storage 150. In some embodiments, the access manager 175 may provide a user interface that allows a user to specify various access control settings for the backup data. In addition, the access manager 175 may direct (or control, initiate, etc.) other components of the operating environment 100 to perform various processes as further described herein. The access manager 175 may also determine which accounts may perform backup operations on backup data stored on the object storage 150.

The backup system 120 may maintain an access control database 185. The access control database 185 may indicate which user accounts may perform certain backup operations as further described herein. For example, when a request for a backup operation is received, the backup system 120 (e.g. manager 175) may refer to the access control database 185, which may be stored locally, to determine whether the requested operation is authorized. Accordingly, the backup system 120 may perform such a determination from information stored locally and without having to access the object storage 150 for such information. The access control database 185 may include an embedded database. For example, the access control database 185 may be created by the backup system 120 using a particular software library (e.g. SQLite library).

The backup system 120 may also maintain security tools 195. The security tools 195 may be used to verify backup administrator accounts. In addition, the security tools 195 may include encryption/decryption keys (or components) that are used to encrypt data to be stored within objects 155 of the object storage 150, for example, as part of a backup operation, and to decrypt data stored within the objects 155 as part of a recovery operation.

To further improve potential storage and recovery efficiency, the backup system 120 may leverage a specialized metadata database 160. The metadata database 160 may be maintained by the backup system 120. The metadata database 160 may include an embedded database. For example, the metadata database 160 may be created by the backup system 120 using a particular software library (e.g. SQLite library). The metadata database 160 may reside on the object storage 150, the backup system 120, and/or another component (e.g. cloud-based component) that is accessible by the backup system 120. For example, the backup system 120 may update the metadata database 160 when residing on the object storage 150 by accessing the storage API 152. The metadata database 160 may store metadata (e.g. information) associated with client data stored on the client device 110 and/or backed up to the object storage 150. The metadata database 160 may also store various types of backup information associated with the backed up client data. For example, the backup information may include a point-in-time the client data was backed up, a storage location of the backed-up client data, an object ID to which the backed up client data is stored, and various other types of information. Accordingly, the metadata database 160, and more particularly, the metadata stored therein, may be leveraged by the backup system 120 when storing data in an efficient manner. For example, when backing up data (e.g. as part of an incremental backup), data written to the object storage 150 may include only changes to the metadata associated with the client data. In such circumstances, the backup system 120 may store such changes exclusively within the metadata database 160. In other words, certain changes to client data may be stored only within the metadata database 160 and not within objects of the object storage 150. This results in a conservation of storage resources as new data objects may not be required when writing (or storing) data on the object storage 150.

Figure 2:
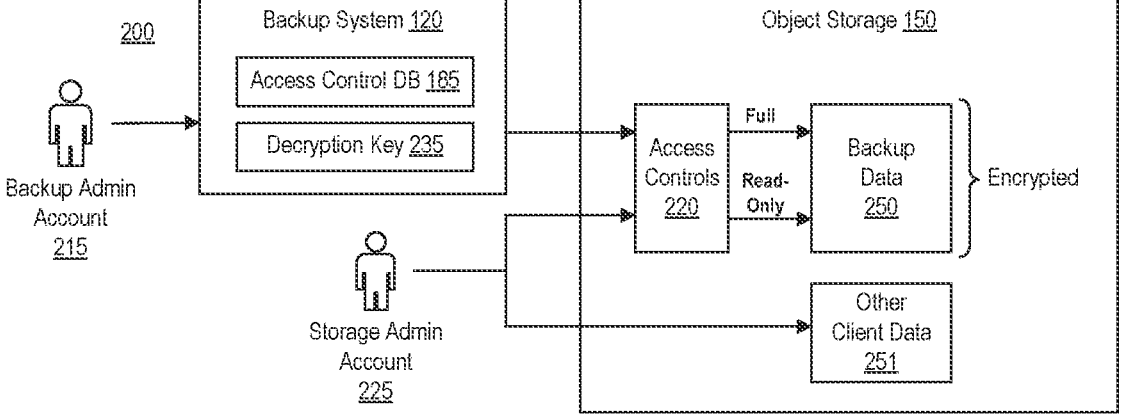
FIG. 2 is a diagram illustrating an example configuration of controlling access to backup data stored on an object storage according to one or more embodiments of the disclosure.

FIG. 2 is a diagram illustrating an example configuration of controlling access to backup data stored on an object storage according to one or more embodiments of the disclosure.

As shown in diagram 200, a backup administrator account 215 may be associated with the backup system 120. In some embodiments, the backup system 120 may control access to the backup data 250 via the backup administrator account 215. For example, the backup system 120 may administer (or manage, control, etc.) the backup administrator account 215. In other words, the backup administrator account 215 may be a backup-system-administered account. For example, the backup administrator account 215 may be managed by the backup system 120 as part of an application layer that works in conjunction with (e.g. on top of) a storage layer provided by the object storage 150. Thus, the backup system 120 may act as a gateway for accessing the backup data 250 using the backup administrator account 215. In some embodiments, the backup administrator account 215 may first access the backup system 120 via a backup system interface, and then the backup system 120 may relay instructions (e.g. backup operations) on behalf of the backup administrator account 215 to the object storage 150. For example, the backup system 120 may be responsible for verifying the credentials (e.g. password, key, etc.) provided by a user of the backup administrator account 215 before relaying (or forwarding) requested operations to the object storage 150. In some embodiments, the backup system 120 may relay the credentials provided by the backup administrator account 215 to the object storage 150 for verification.

In addition, as shown, a storage administrator account 225 may be associated directly with the object storage 150. In some embodiments, the object storage 150 may control direct access to the backup data 250 via a storage administrator account 225. For example, the object storage 150 may administer (or manage, control, etc.) the storage administrator account 225. In other words, the storage administrator account 225 may be an object-storage-administered account. In some embodiments, the storage administrator account 225 may access the object storage 150 via an object storage interface. For example, the storage administrator account 225 may be managed by the object storage 150 as part of a storage layer. The object storage 150 may be responsible for verifying the credentials (e.g. password, key, etc.) provided by a user of the storage administrator account 225 before allowing access to the data stored on the object storage 150.

Accordingly, as shown in this example, access to the object storage 150 may be provided via multiple access paths (or interfaces) including a direct path to the object storage 150 via the storage administrator account 225, and an indirect path via a backup administrator account 215 that is routed through the backup system 120.

As shown, the backup data 250 may have certain access controls 220. The access controls 220 may be administered (e.g. enforced) by the object storage 150. The access controls may be account-specific (e.g. role-based, user-based, etc.). Accordingly, different accounts (or users) may have different limitations with respect to accessing the backup data 250. For example, access to the backup data 250 from with the backup administrator account 215 or the storage administrator account 225 may be dependent upon these access controls 220. In this example, the backup administrator account 215 may be the owner of the backup data 250. Accordingly, as shown, the backup administrator account 215 may have full access to the backup data 250, and the backup administrator account 215 may grant the storage administrator account 225 read-only access to the backup data 250.

The access controls 220 may include various permissions (or restrictions, limitations, properties, etc.) on accessing the backup data 250. For example, the access controls may specify whether an account may read, write, delete, or modify data. In some embodiments, the access controls 220 may include a limited access setting that allows an account to only read data (e.g. read-only), and not write, delete, or modify data. In addition, the access controls 220 may include a full access setting that allows an account to read, write, delete, and modify data. In some embodiments, an owner of the backup data 250 may specify (e.g. grant, define, limit, etc.) the access controls 220. For example, in some embodiments, an account (e.g. backup administrator account 215) that initiates the backup of client data would be considered the owner of the backup data 250. Accordingly, such an account would be authorized by the object storage 150 to specify the access controls 220 for the backup data 250. In some embodiments, the default access controls setting may include limiting access to the owner of the data. For example, upon performing a backup, only the backup administrator account 215 associated with the backup would have full access to the backup data 250.

In some embodiments, the access controls 220 may be specified at an object level (e.g. object-specific), or for a collection of objects (e.g. bucket, container, etc.). For example, the backup data 250 of a particular backup or a set of client data may be stored within a particular set of objects. Accordingly, the access controls 220 may be specified for the particular set of objects (or collection of objects).

As stated, the access controls 220 may be administered by the object storage 150. For example, the object storage 150 (e.g. via an operating system of the object storage 150) may enforce which accounts may access the backup data 250 based on the specified access controls 220. In some embodiments, the backup system 120 may specify the access controls 220 using an API (e.g. storage API 152) of the object storage 150. Accordingly, the object storage 150 may maintain an access control database that is used to enforce the access controls 220. In some embodiments, the access controls 220 may be stored as part of the metadata associated with objects that store the backup data 250.

It should be noted that the access controls 220 described herein are provided as examples, and other configurable permissions that may be available based on the cloud-based storage provider are also contemplated.

In some embodiments, a client and/or the backup system 120 may be associated with multiple backup administrator accounts 215. For example, the backup administrator account 215 may include a first backup administrator (e.g. email backup admin) for a first type of client data (e.g. emails), and a second backup administrator (e.g. database backup administrator) for a second type of client data (e.g. databases). Accordingly, by default, the first backup administrator may not have full access the second type (or subtype) of backup data 250, and the second backup administrator may not have full access the first type (or subtype) of backup data 250. However, the first backup administrator may grant full access (or a limited set of permissions) to the second backup administrator by updating the access controls 220 and vice versa. In addition, the backup administrator account 215 may include a "super" account that may create additional backup administrator accounts 215, and may be authorized to define access control polices.

As shown, the backup data 250 may be encrypted. In some embodiments, the backup system 120 may encrypt the backup data 250 as part of a backup processing. Accordingly, even though the storage administrator account 225 may have read-only access the backup data 250, the backup data 250 is unusable without being decrypted. To decrypt the backup data 250, an account would need to have access to the decryption key 235. As shown, the decryption key 235 may be secured by the backup system 120, and accordingly, the backup system 120 may control access to the decryption key 235. In some embodiments, the backup system 120 may prevent exposure of the decryption key 235 to object storage 150, and thus, also the storage administrator account 225. For example, even if the storage administrator account 225 has unrestricted access to the object storage 150, the storage administrator account 225 would not be able to obtain the decryption key 235 from the object storage 150. In other words, access to the decryption key 235 may be exclusively controlled by the backup system 120. Thus, the contents of the backup data 250 remain secure from accounts (or users) other than those administered by the backup system 120. For example, the backup system 120 may grant decryption key 235 access to the backup administrator account 215 such that the backup administrator account 215 can perform backup operations on the backup data 250. For example, the backup administrator account 215 may be allowed to decrypt the backup data 250 to perform a data recovery procedure.

As shown, the access configuration limits access to data stored on the object storage 150 in a tailored (or precise) manner. For example, as shown, the storage administrator account 225 may still have full access to other client data 251 stored on the object storage 150. This may include other types of non-backup data that may be associated with a client (or client device). As a result, the storage administrator account 225 may still manipulate (e.g. write or delete) non-backup data for storage management purposes. However, the owner of the other client data 251 may include additional accounts associated with a client apart from the backup administrator account 215. In some embodiments, although not shown, the other client data 251 may also be subject to access controls. For example, the storage administrator account 225 may not be able to delete the other client data 251. Accordingly, the storage administrator account 225 may still be able to at least read all the data stored on the object storage 150. In other words, the storage administrator account 225 may still be aware of the existence of backup data 250, along with the other client data 251, such that the storage administrator account 225 may perform various data management activities or analysis. As a result, the described access configuration works in conjunction with existing access policies administered by the object storage 150, while at the same time ensuring the backup data 250 is not modifiable or recoverable by accounts not administered by the backup system 120.

Based on the defined access controls 220, the backup system 120 may restrict the initiation of backup operations on the backup data 250 based on an access control database 185. In some embodiments, the access control database 185 may be based on the access controls 220 specified for the backup data 250. In some embodiments, the access control database 185 may be distinct from the access controls 220 maintained and administered by the object storage 150. For example, the backup system 120 may maintain the access control database 185, which is stored as part of the backup system 120. In some embodiments, the access control database 185 may be local to the backup system 120. For example, when a request for a backup operation is received, the backup system 120 may access the access control database 185, which is stored in memory (or cache), to determine whether the requested operation is authorized. Accordingly, the backup system 120 may perform such a determination from information stored locally and without having to access the object storage 150 for such information.

As described, in some embodiments, the access control database 185 may be based on a defined access controls 220. For example, if a first backup administrator account that is the owner of the backup data 250 does not update the access controls 220, the access control database 185 may list only the first backup administrator account as being authorized to perform backup operations on the backup data 250. Accordingly, if a second backup administrator account requests performing a recovery of the backup data 250, the backup system 120 may deny the request in such a scenario based on the information stored by the access control database 185.

As another example, if the first backup administrator account associated with the backup data 250 updates the access controls 220 for the backup data 250 to allow full access to a second backup administrator account, the access control database 185 may list the first and second backup administrator accounts as being authorized to perform backup operations on the backup data 250. Accordingly, if a second backup administrator account requests performing a recovery of the backup data 250, the backup system 120 may approve the request in such a scenario based on the information stored by the access control database 185. In some embodiments, the backup system 120 may automatically update the access control database 185.

As yet another example, if the first backup administrator account associated with the backup data 250 updates the access controls 220 for the backup data 250 to allow read-only access to a second backup administrator account, the access control database 185 may list only the first backup administrator account as being authorized to perform backup operations on the backup data 250. Accordingly, if a second backup administrator account requests performing a recovery of the backup data 250, the backup system 120 may deny the request in such a scenario based on the information stored by the access control database 185.

The information (authorizations) stored by the access control database 185 may be created automatically in response to the access control policy. For example, in response to specifying the access controls 220, the backup system 120 may automatically store corresponding authorization information as part of the access control database 185. For example, in response to the first backup administrator account specifying, via an access control interface provided by the object storage 150, the second backup administrator account is allowed access to the backup data, the backup system 120 may automatically update the access control database 185 correspondingly.

In some embodiments, an access control policy may be defined for a particular backup. However, as described, the access controls 220 may be object-specific. Accordingly, the backup system 150 may determine which objects are associated with a particular backup by accessing a metadata database (e.g. metadata database 160). For example, the metadata database may store a listing of backups and the corresponding set of objects storing the data for each backup. For example, the backup system 120 may perform a backup at a first time, and accordingly, the metadata database would store the listing of the objects storing the backup data 250 for backup performed at the first time. In some embodiments, the backup system 120 may perform incremental backups, and accordingly, the metadata database may identify the set of objects required to perform a recovery to a particular point-in-time. Accordingly, the access controls 220 for particular objects may be updated based on the information stored by the metadata database.

Figure 3:
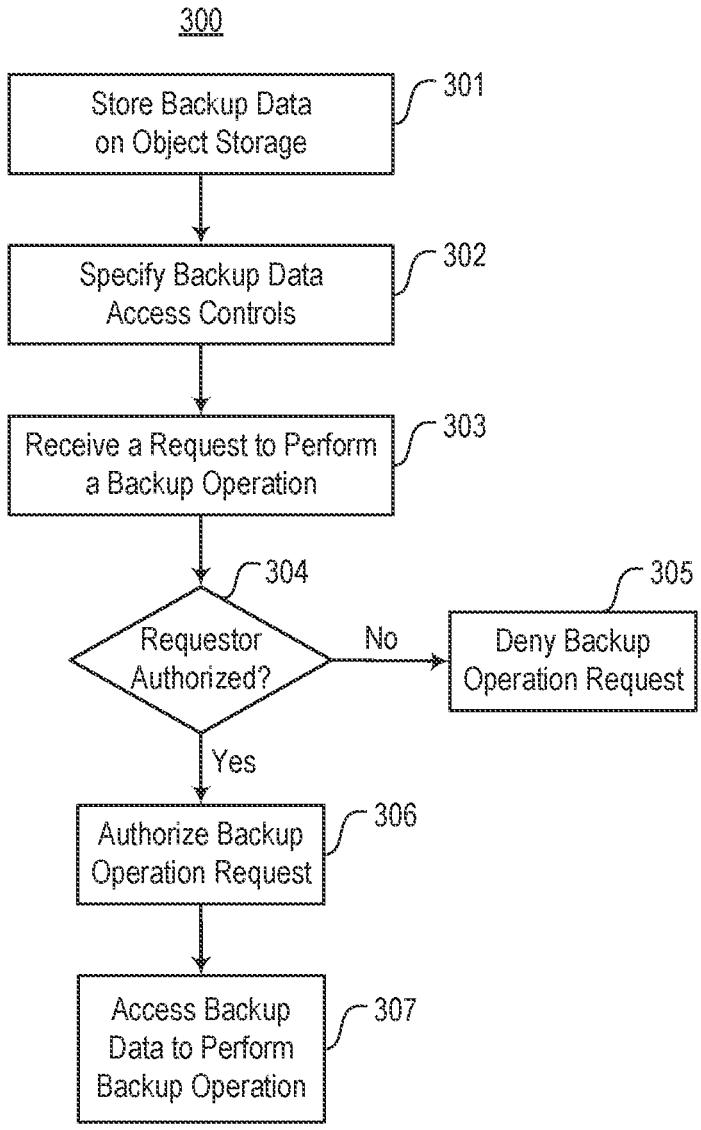
FIG. 3 is a flow diagram illustrating an example process for authorizing a backup operation to be performed on backup data stored by an object storage according to one or more embodiments of the disclosure.

FIG. 3 is a flow diagram illustrating an example process for authorizing a backup operation to be performed on backup data stored by an object storage according to one or more embodiments of the disclosure. Process 300 may use processing logic, which may include software, hardware, or a combination thereof. For example, process 300 may be performed by a system including one or more components described in operating environment 100 (e.g. backup system 120).

In 301, the system (backup system 120) may store backup data (e.g. backup data 250) on an object storage (e.g. object storage 150). In some embodiments, the system may store the backup data as part of a backup processing performed to backup data from a client device (e.g. client device 110) to the object storage. In 302, the system may specify backup data access controls for the backed up data. In some embodiments, the access controls (e.g. access controls 220) may be specified as part of an access control policy (or security policy) defined by a client (e.g. via a backup administrator account 215). In some embodiments, the access control policy may be specified before or after particular backups are performed. For example, as part of a backup configuration, the client may specify the access controls indicating which user accounts (e.g. backup administrator accounts) may have access to particular types of backup data. As described, the access control policy may be account-specific, object-specific, backup-specific, or a combination thereof. For example, the access control policy may be defined for a particular backup and for a particular account. In 303, the system may receive a request to perform a backup operation. The backup operation may include any operations (or methods, functions, etc.) associated with accessing the backup data. For example, the backup operation may include performing a recovery of the backup data, a modification of the backup data, a deletion of backup data, or various other data-related operations. The request may be received from an account administered by the backup system. Accordingly, in 304, the backup system may determine whether the requesting account is authorized to perform the requested backup operation. For example, the backup system may maintain an access control database (e.g. access control database 185) that stores a listing of accounts (e.g. backup administrator accounts 215) and a corresponding set of authorizations. These authorizations may be based on the access controls specified in operation 302. For example, the backup administrator account that is an owner of the backup data stored on the object storage may specify which accounts may access or modify particular backup data stored on the object storage. For example, an account that has read-only access to the backup data stored on the object storage would not be authorized to perform a backup operation. Accordingly, if the backup system determines the account requesting the backup operation is not authorized, in 305, the backup system may deny the backup operation request. However, if the backup system determines the account requesting the backup operation is authorized, in 306, the backup system may authorize the backup operation request. Once authorization has been verified, in 307, the backup system may access the backup data to perform the requested backup operation.

FIG. 4 is a flow diagram illustrating an example method of specifying access controls for backup data stored on an object storage according to one or more embodiments of the disclosure. Process 400 may use processing logic, which may include software, hardware, or a combination thereof. For example, process 400 may be performed by a system including one or more components described in operating environment 100 (e.g. backup system 120).

In 401, the system (e.g. backup system) may perform a backup of client data stored on a client device (e.g. client device 110) to a cloud-based object storage (e.g. object storage 150). The backup may include encrypting the client data and storing the encrypted data (e.g. backup data 250) as part of a first set of objects on the object storage. In some embodiments, the encrypted data may be associated with a first backup administrator account (e.g. a first backup administrator account 215). For example, the first administrator account may be considered the owner of the data stored by the first set of objects. In some embodiments, the object storage may manage access to data stored on the object storage via a storage administrator account (e.g. storage administrator account 225).

In 402, the system may maintain a decryption key (e.g. decryption key 235) for the encrypted data including preventing access to the decryption key from the object storage and the storage administrator account. For example, only accounts administered by a backup system may be authorized to access the decryption key.

In 403, the system may specify, using the first backup administrator account, a set of access controls (e.g. access controls 220) for the first set of objects including a first setting allowing read-only access to the first set of objects by the storage administrator account, and a second setting allowing full access to the first set of objects by a second backup administrator account (e.g. a first backup administrator account 215).

In some embodiments, the second backup administrator account may be associated with a second set of objects stored by the object storage. For example, the second backup administrator account may be identified as the owner of the data stored by the second set of objects. In some embodiments, the second set of objects may also store encrypted data from a backup operation, for example, as part of a second backup performed by the backup system.

In some embodiments, the set of access controls may be administered by the object storage. Accordingly, in some embodiments, specifying the set of access controls for the first set of objects may include providing the set of access controls to an access control interface provided by the object storage. For example, the access controls maintained (e.g.

enforced) by the object storage may be provided from a backup system to the object storage via a storage API (e.g. storage API 152).

In some embodiments, the system may set access controls based on a request to restrict access to particular backups. Accordingly, in some embodiments, specifying the set of access controls for the first set of objects may include receiving information to identify backed-up client data stored on the object storage (e.g. a backup time), determining the received information identifies the performed backup, and accessing metadata associated with the performed backup to identify the first set of objects as storing the backed-up client data. For example, the metadata may be accessed from a metadata database (e.g. metadata database 160) that may be maintained by the backup system and/or the object storage.

In 404, the system may store information indicating the second administrator account is allowed full access to the first set of objects. In some embodiments, the information may be stored as part of an access control database (e.g. access control database 185). The access control database may be maintained by the backup system. For example, the access control database may be stored as part of the backup system (e.g. local storage of the backup system). In some embodiments, storing information indicating the second administrator account is allowed full access to the first set of objects is performed automatically in response to specifying the set of access controls includes the second setting allowing full access to the first set of objects by the second backup administrator account.

In 405, the system may receive, from the second backup administrator account, a request to perform a backup operation associated with the first set of objects. In some embodiments, the request to perform the backup operation may include a request to perform a recovery of at least a portion of the encrypted data.

In 406, the system may read (or lookup, search, access, etc.) the access control database to determine whether the second backup administrator account is allowed full access to the first set of objects. In some embodiments, the system may read the access control database in response to receiving the request to perform a backup operation. In some embodiments, the system may read the access control without accessing the object storage.

In 407, the system may initiate the backup operation including decrypting the encrypted data using the decryption key, in response to determining the second backup administrator account is allowed full access to the first set of objects. In some embodiments, the initiated backup operation may include performing a recovery of at least a portion of the encrypted data stored by the first set of objects.

In some embodiments, the system may manage additional backup administrator accounts. For example, specifying the set of access controls for the first set of objects may also include a third setting allowing read-only access to the first set of objects by a third backup administrator account. Accordingly, the system may store, as part of the access control database maintained by the backup system, information indicating the third administrator account is not allowed full access to the first set of objects. Thus, the system may receive, from the third backup administrator account, a request to perform a backup operation associated with the first set of objects, and in response, read, without accessing the object storage, the access control database to determine the third backup administrator account is not allowed full access to the first set of objects. Accordingly, the system may deny the request to perform a backup operation from the third backup administrator account.

Figure 5:
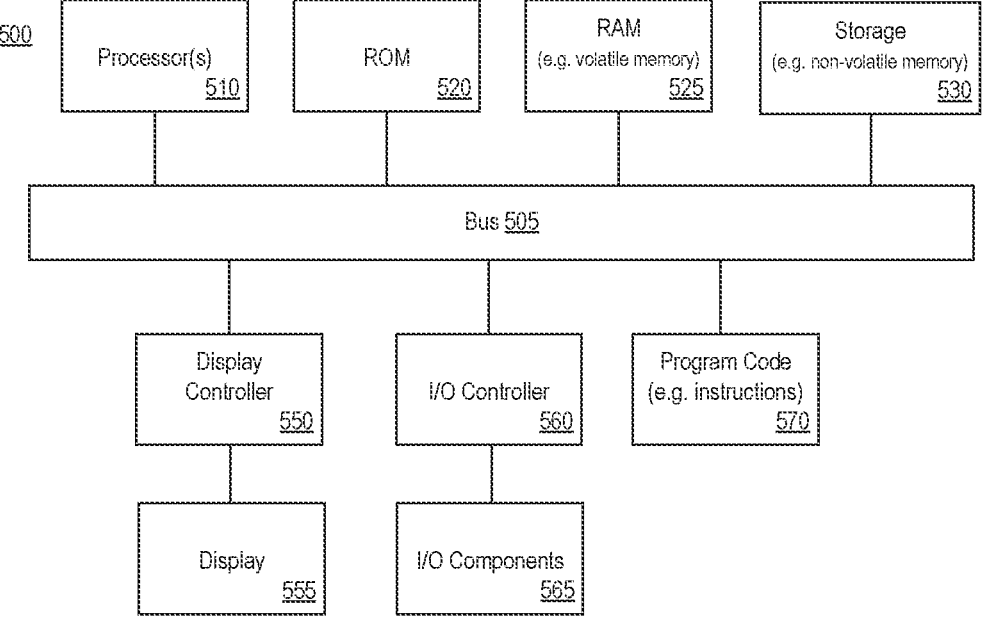
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. backup system 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. backup system 120, manager 175, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:

one or more processors; and a non-transitory computer-readable medium storing a plurality of instructions, which when executed, cause the one or more processors to:

perform, by a backup system, a backup of client data stored on a client device to an object storage, which is cloud-based, the backup including encrypting the client data and storing the encrypted data as part of a first set of objects on the object storage, the encrypted data associated with a first backup administrator account, the first backup administrator account being associated with the backup system and the client data stored on the client device, and the object storage having a storage administrator account that manages access to data stored on the object storage, the backup system and the object storage each having separate access accounts, where the storage administrator account of the object storage has a default setting of full access to the data stored on the object storage;

maintain, by the backup system, a decryption key for the encrypted data including preventing access to the decryption key from the object storage and the storage administrator account;

specify, by the backup system using the first backup administrator account, a set of access controls for the first set of objects including a first setting restricting the storage administrator account to read-only access of the first set of objects stored on the object storage, which is cloud-based, and a second setting allowing full access to the first set of objects by a second backup administrator account, the second backup administrator account being associated with the backup system and the client data stored on the client device, the client data associated with the second backup administrator being one of the same or different than the client data associated with the first backup administrator, such that when a request for a backup operation is made by the storage administrator account, the request for the backup operation is denied based on the storage administrator account not having full access to the first set of objects;

receive, by the backup system and from the second backup administrator account, a request to perform a backup operation associated with the first set of objects; and initiate, by the backup system, the backup operation including decrypting the encrypted data using the decryption key, in response to determining the second backup administrator account is allowed full access to the first set of objects.

2. The system of claim 1, wherein the set of access controls are administered by the object storage.

3. The system of claim 2, wherein the specifying the set of access controls for the first set of objects includes providing the set of access controls to an access control interface provided by the object storage.

4. The system of claim 3, wherein the specifying the set of access controls for the first set of objects includes:

receiving information to identify backed-up client data stored on the object storage;

determining the received information identifies the performed backup; and accessing metadata associated with the performed backup to identify the first set of objects as storing the backed-up client data.

5. The system of claim 1, wherein the plurality of instructions, when executed, further cause the one or more processors to:

store, as part of an access control database maintained by the backup system, information indicating the second administrator account is allowed full access to the first set of objects; and read, in response to the request to perform the backup operation and without accessing the object storage, the access control database to determine whether the second backup administrator account is allowed full access to the first set of objects.

6. The system of claim 5, wherein the storing, as part of the access control database maintained by the backup system, information indicating the second administrator account is allowed full access to the first set of objects is performed automatically, in response to specifying the set of access controls including the second setting allowing full access to the first set of objects by the second backup administrator account.

7. The system of claim 1, wherein the first backup administrator account is identified as the owner of the encrypted data by the object storage.

8. The system of claim 1, wherein the request to perform the backup operation includes a request to perform a recovery of at least a portion of the encrypted data.

9. A method comprising:

performing, by a backup system, a backup of client data stored on a client device to an object storage, which is cloud-based, the backup including encrypting the client data and storing the encrypted data as part of a first set of objects on the object storage, the encrypted data associated with a first backup administrator account, the first backup administrator account being associated with the backup system and the client data stored on the client device, and the object storage having a storage administrator account that manages access to data stored on the object storage, the backup system and the object storage each having separate access accounts, where the storage administrator account of the object storage has a default setting of full access to the data stored on the object storage;

maintaining, by the backup system, a decryption key for the encrypted data including preventing access to the decryption key from the object storage and the storage administrator account;

specifying, by the backup system using the first backup administrator account, a set of access controls for the first set of objects including a first setting restricting the storage administrator account to read-only access of the first set of objects stored on the object storage, which is cloud-based, and a second setting allowing full access to the first set of objects by a second backup administrator account, the second backup administrator account being associated with the backup system and the client data stored on the client device, the client data associated with the second backup administrator being one of the same or different than the client data associated with the first backup administrator, such that when a request for a backup operation is made by the storage administrator account, the request for the backup operation is denied based on the storage administrator account not having full access to the first set of objects;

receiving, by the backup system and from the second backup administrator account, a request to perform a backup operation associated with the first set of objects; and initiating, by the backup system, the backup operation including decrypting the encrypted data using the decryption key, in response to determining the second backup administrator account is allowed full access to the first set of objects.

10. The method of claim 9, wherein the set of access controls are administered by the object storage.

11. The method of claim 10, wherein the specifying the set of access controls for the first set of objects includes providing the set of access controls to an access control interface provided by the object storage.

12. The method of claim 11, wherein the specifying the set of access controls for the first set of objects includes:

receiving information to identify backed-up client data stored on the object storage;

determining the received information identifies the performed backup; and accessing metadata associated with the performed backup to identify the first set of objects as storing the backed-up client data.

13. The method of claim 9, further comprising:

storing, as part of an access control database maintained by the backup system, information indicating the second administrator account is allowed full access to the first set of objects; and reading, in response to the request to perform the backup operation and without accessing the object storage, the access control database to determine whether the second backup administrator account is allowed full access to the first set of objects.

14. The method of claim 13, wherein the storing, as part of the access control database maintained by the backup system, information indicating the second administrator account is allowed full access to the first set of objects is performed automatically, in response to specifying the set of access controls including the second setting allowing full access to the first set of objects by the second backup administrator account.

15. A computer program product comprising a non-transitory computer-readable medium having a computer-readable program code embodied therein to be executed by one or more processors, the program code including instructions to:

perform, by a backup system, a backup of client data stored on a client device to an object storage, which is cloud-based, the backup including encrypting the client data and storing the encrypted data as part of a first set of objects on the object storage, the encrypted data associated with a first backup administrator account, the first backup administrator account being associated with the backup system and the client data stored on the client device, and the object storage having a storage administrator account that manages access to data stored on the object storage, the backup system and the object storage each having separate access accounts, where the storage administrator account of the object storage has a default setting of full access to the data stored on the object storage;

maintain, by the backup system, a decryption key for the encrypted data including preventing access to the decryption key from the object storage and the storage administrator account;

specify, by the backup system using the first backup administrator account, a set of access controls for the first set of objects including a first setting restricting the storage administrator account to read-only access of the first set of objects stored on the object storage, which is cloud-based, and a second setting allowing full access to the first set of objects by a second backup administrator account, the second backup administrator account being associated with the backup system and the client data stored on the client device, the client data associated with the second backup administrator being one of the same or different than the client data associated with the first backup administrator, such that when a request for a backup operation is made by the storage administrator account, the request for the backup operation is denied based on the storage administrator account not having full access to the first set of objects;

receive, by the backup system and from the second backup administrator account, a request to perform a backup operation associated with the first set of objects; and initiate, by the backup system, the backup operation including decrypting the encrypted data using the decryption key, in response to determining the second backup administrator account is allowed full access to the first set of objects.

16. The computer program product of claim 15, wherein the set of access controls are administered by the object storage.

17. The computer program product of claim 16, wherein the specifying the set of access controls for the first set of objects includes providing the set of access controls to an access control interface provided by the object storage.

18. The computer program product of claim 17, wherein the specifying the set of access controls for the first set of objects includes:

receiving information to identify backed-up client data stored on the object storage;

determining the received information identifies the performed backup; and accessing metadata associated with the performed backup to identify the first set of objects as storing the backed-up client data.

19. The computer program product of claim 15, wherein the program code includes further instructions to:

store, as part of an access control database maintained by the backup system, information indicating the second administrator account is allowed full access to the first set of objects; and read, in response to the request to perform the backup operation and without accessing the object storage, the access control database to determine whether the second backup administrator account is allowed full access to the first set of objects.

20. The computer program product of claim 19, wherein the storing, as part of the access control database maintained by the backup system, information indicating the second administrator account is allowed full access to the first set of objects is performed automatically, in response to specifying the set of access controls including the second setting allowing full access to the first set of objects by the second backup administrator account.

* * * * *